United States Patent
Xu

(10) Patent No.: US 9,445,273 B2
(45) Date of Patent: Sep. 13, 2016

(54) ESTABLISHING WLAN ASSOCIATION

(71) Applicant: Hangzhou H3C Technologies Co., Ltd., Hangzhou (CN)

(72) Inventor: Guoxiang Xu, Beijing (CN)

(73) Assignee: HANGZHOU H3C TECHNOLOGIES CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 14/648,166

(22) PCT Filed: Dec. 18, 2013

(86) PCT No.: PCT/CN2013/089790
§ 371 (c)(1),
(2) Date: May 28, 2015

(87) PCT Pub. No.: WO2014/094615
PCT Pub. Date: Jun. 26, 2014

(65) Prior Publication Data
US 2015/0334571 A1 Nov. 19, 2015

(30) Foreign Application Priority Data
Dec. 20, 2012 (CN) .......................... 2012 1 0560648

(51) Int. Cl.
*H04M 1/66* (2006.01)
*H04W 12/08* (2009.01)
*H04W 8/22* (2009.01)
*H04W 12/04* (2009.01)
*H04W 12/06* (2009.01)
*H04W 84/12* (2009.01)

(52) U.S. Cl.
CPC ............. *H04W 12/08* (2013.01); *H04W 8/22* (2013.01); *H04W 12/04* (2013.01); *H04W 12/06* (2013.01); *H04W 84/12* (2013.01)

(58) Field of Classification Search
None
See application file for complete search history.

(56) References Cited

U.S. PATENT DOCUMENTS

| 7,275,157 | B2 | 9/2007 | Winget |
| 2011/0154039 | A1 | 6/2011 | Liu et al. |
| 2012/0005731 | A1 | 1/2012 | Lei et al. |

(Continued)

FOREIGN PATENT DOCUMENTS

| CN | 101155092 | 4/2008 |
| WO | WO00/41427 | 7/2000 |

(Continued)

OTHER PUBLICATIONS

International Search Report and Written Opinion dated Mar. 27, 2014 issued on PCT Patent Application No. PCT/CN2013/089790 dated Dec. 18, 2013, The State Intellectual Property Office, P.R. China.

(Continued)

*Primary Examiner* — Adolf Dsouza
(74) *Attorney, Agent, or Firm* — Hewlett Packard Enterprise Patent Department

(57) ABSTRACT

A method of establishing network connection between a network device and a WLAN is disclosed. The method includes: determining whether there is previous security association between the network device and the WLAN at the time of requesting for network association, and establishing a new security association between the network device and the WLAN using security data generated in the course of establishing the previous security association if there is the previous security association.

15 Claims, 7 Drawing Sheets

(56) References Cited

U.S. PATENT DOCUMENTS

| | | |
|---|---|---|
| 2012/0110324 A1 | 5/2012 | Geng et al. |
| 2013/0095789 A1* | 4/2013 | Keevill ................. H04W 12/06 455/411 |
| 2013/0196708 A1* | 8/2013 | Narasimhan .......... H04L 9/0827 455/525 |
| 2014/0050320 A1* | 2/2014 | Choyi .................... H04L 63/08 380/270 |

FOREIGN PATENT DOCUMENTS

| | | |
|---|---|---|
| WO | WO2006/032046 | 3/2006 |
| WO | WO2011/017990 | 2/2011 |

OTHER PUBLICATIONS

Vatn, Jon-Olov, "A roaming architecture for IP based mobile telephony in WLAn environments", 2003.

* cited by examiner

ESTABLISHING WLAN ASSOCIATION

CLAIM FOR PRIORITY

The present application is a national stage filing under 35 U.S.C 371 of PCT application number PCT/CN2013/089790, having an international filing date of Dec. 18, 2013, which claims priority to Chinese patent application number 201210560648.5 having a filing date of Dec. 20, 2012, the disclosures of which are hereby incorporated by reference in their entireties.

BACKGROUND

Wireless local area networks (WLANs) allow data communication devices to connect to a computer network without a wired connection and provide great mobility to users. Nowadays, WLANs are widely deployed in homes, commercial establishments, organizations, as well as government environments.

A device that supports wireless data communication in a WLAN is known as a wireless station (STN). Client devices such as mobile devices, laptop computers, smartphones, tablets, desktop computers, workstations or peripheral devices connected to the WLAN are all examples of wireless stations.

Each wireless station is equipped with a data connection device known as a wireless network interface controller (WNIC) to facilitate WLAN operation. Wireless stations typically connect to the WLAN through access points (APs). APs transmit and receive radio frequency signals to facilitate wireless data communication between a wireless station and other devices connected to the WLAN. While WLANs provide great flexibility and mobility, the open nature of wireless communication environment has necessitated the use of authentication mechanisms to authenticate the identity of a device before allowing that device to access the WLAN as a client. Description of Figures The disclosure will be described by way of non-limiting example with reference to the accompanying Figures, in which:—

Figure 2:
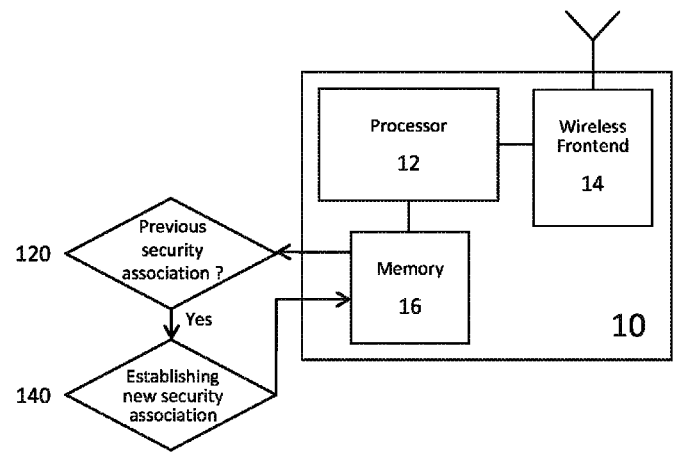
Figure 3:
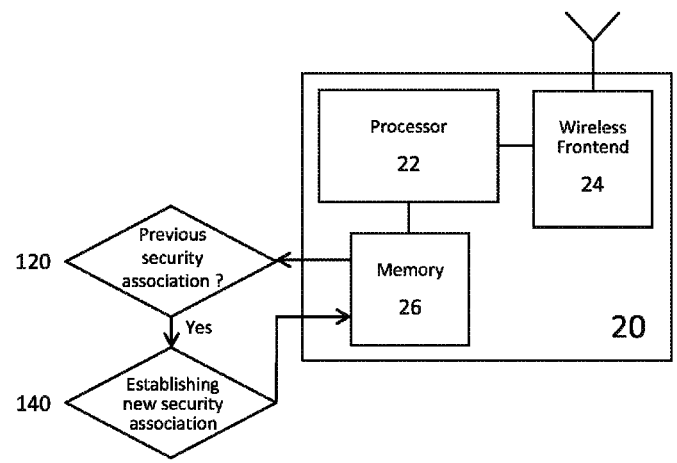
Figure 4:
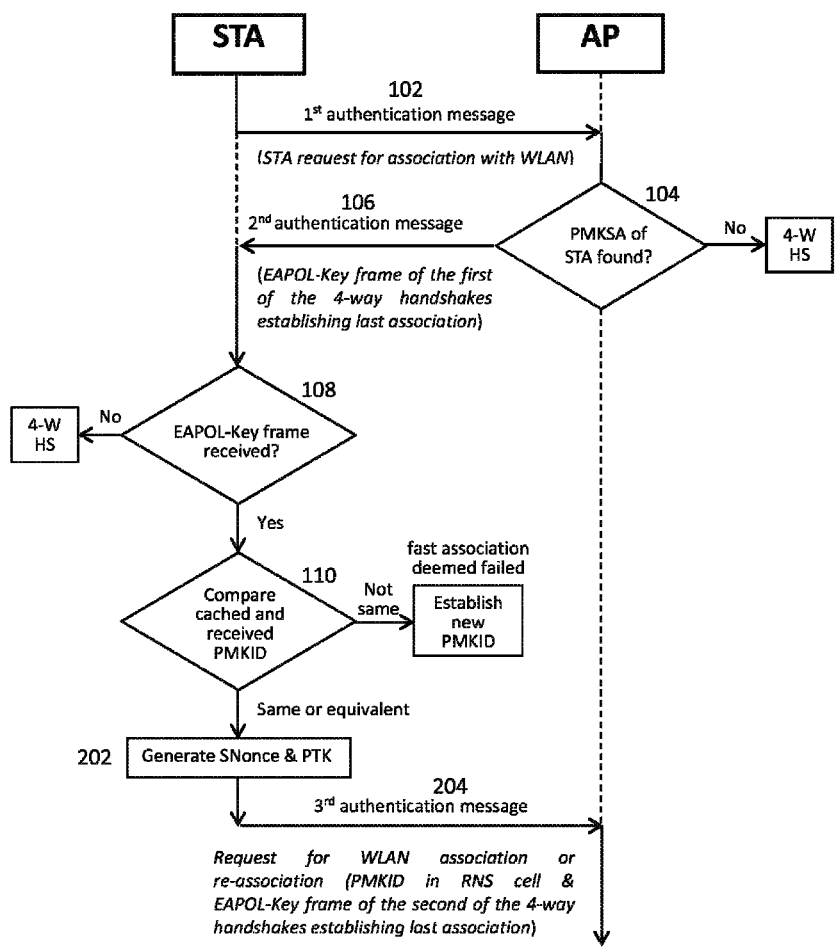
Figure 4A:
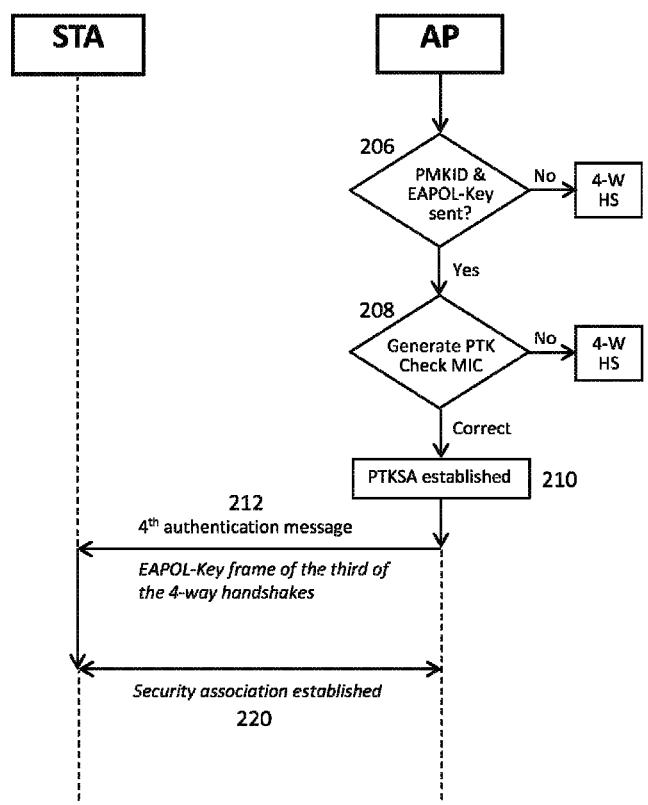
Figure 5:
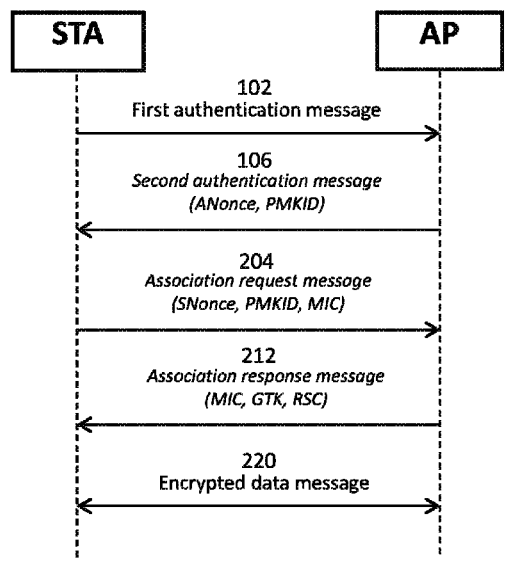
Figure 6:
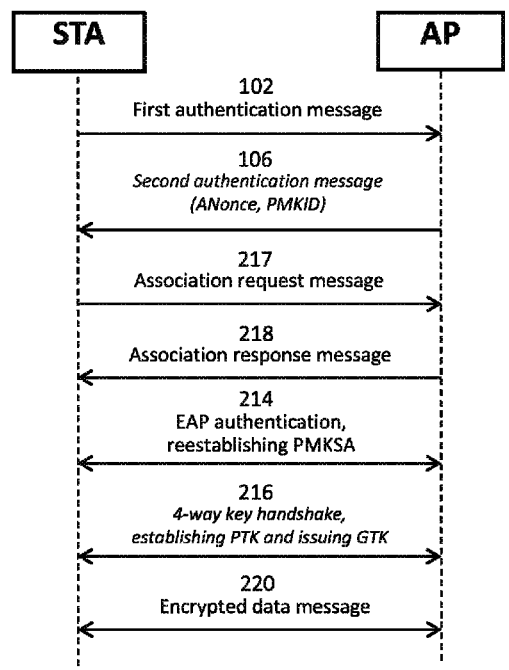
Figure 7:
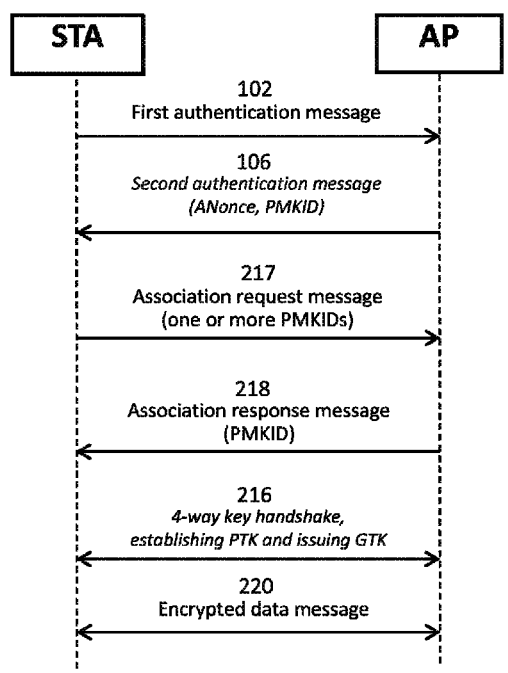

FIG. 2 depicts an example network admission apparatus according to the present disclosure, FIG. 3 depicts an example network device according to the present disclosure, FIGS. 4 and 4A are flow diagrams depicted operation flows according to the present disclosure, FIG. 5 are flow diagrams depicting flow of messages to establish WLAN re-association according to the present disclosure, FIG. 6 are flow diagrams depicting flow of messages to establish WLAN re-association according to another example of the present disclosure, and FIG. 7 are flow diagrams depicting flow of messages to establish WLAN re-association according to another example of the present disclosure.

DESCRIPTION

WLANs are more commonly known under the name 'Wi-Fi' to the public. The Institute of Electrical and Electronics Engineers (IEEE) and the Internet Engineering Task Force (IETF) are the two most influential standard setting bodies that create standards and protocols for WLAN. The IEEE is one of the most influential standards bodies in the world for information technology. The IEEE 802.11 standards and its variants are virtually adapted as the global technical standard governing wireless local area networks (WLANs). The standards are created and maintained by IEEE LAN/MAN Standards Committee (IEEE 802). Among the various IEEE 802.11 standards, IEEE 802.11i relates to key management and establishment to enhance security aspects of IEEE 802.11 and IEEE 802.11x defines authentication mechanisms with Port-based Network Access Control (PNAC) to facilitate devices to attach to a WLAN. The IEEE 802.11 family of standards, especially IEEE 802.11, IEEE 802.11i and IEEE 802.11x are incorporated herein by reference specifically. IEEE 802.11i provides a Robust Security Network (RSN) with a 4-Way Handshake and a Group Key Handshake.

The IETF is another influential standards body that creates standards and protocols for the Internet. Important standards and protocols published by IETF include the core protocols of the Internet Protocol Suite (TCP/IP) and the Extensible Authentication Protocol (EAP) defined in RFC3748 (obsoleting RFC2248) and later updated in RFC5247. The IEEE 802.11 standards and its variants relating to WLAN and the various IETF standards relating to WLAN authentication such as RFC3579, RFC3748 and RFC5247 are incorporated herein by reference.

Before an entity is allowed to access a WLAN and its associated resources as an authorized client station (STA), the entity will need to accomplish an authentication process more known as 'entity authentication and association'. Authentication process by a WLAN in the IEEE 802.11 environment may be based on a three-party model involving i) the supplicant, which requires access ii) the authenticator, which grants access and iii) the authentication server, which gives permission. In the wireless world, the supplicant is a client station (STA) and the authenticator is an access point (AP). The function of the authentication server is to determine whether an entity can be allowed access and an authenticator itself does not possess that function. In the IETF world, the supplicant is called a peer and the authenticator is referred to as the network access server (NAS) or Remote Dial-in User Service (RADIUS) client. In many cases, the authenticator and the authentication server roles can be performed by one device, such as the AP.

In this disclosure, connection and reconnection by a mobile client station STA to a WLAN will be described with reference to operations pursuant to IEEE 802.11 and IETF environments as a convenient example without loss of generality.

When an entity (aka supplicant or STA) wishes to connect to the WLAN, the entity will initiate an access request to an access port. Upon receipt of the request, the authenticator will start an EAP (Extensible Authentication Protocol) message exchange process to verify identity of that entity. The authenticator will then communicate with the authentication server to decide on an authentication protocol and a set of message exchanges will take place between the supplicant, the authenticator and the authentication server. At the end of this exchange, a success or failure state will be reached. If the authentication is successful, the authenticator will grant WLAN access to the supplicant through the access port. It should be noted that a supplicant does not necessarily always initiate the access request. For example, the authenticator in 802.1X can initiate an authentication request when it senses a disabled-to-enabled state transition at an access port.

During the authentication process, the access point (AP) will authenticate itself to the client station (STA) and keys to encrypt traffic will be derived. The authenticator keeps a security context with the supplicant-port pair.

The 4-Way Handshake

After a successful EAP authentication and establishment of the PMKs (or if PSKs are being used), a station must use the 4-way handshake to establish the transient keys with the AP. The 4-way handshake is a four-packet exchange of EAPOL-Key messages. This ensures that both sides still share a current PMK to exchange nonces to be used in building the key hierarchy and to exchange the GTK.

During operations, a wireless station may need to reconnect to the WLAN after a transient disruption. A disruption may occur when a wireless station roams between APs, or when connection is disrupted inadvertently or due to spurious interference. The lengthy process to reestablish data connection after a transient disconnection has been found to be problematic for many applications such as voice or video applications. In some occasions, reconnection is failed due to back and forth switching of wireless channels during attempted switch over between APs.

Most prevailing authentication mechanisms require a lengthy authentication process to ensure that network integrity is not compromised. However, a lengthy authentication process can be problematic for many applications. For example, when a client device moves from an AP to another AP or when temporality disconnected with an AP may result in unacceptable interruption of real time applications such as VoIP or video conferencing.

In an example WLAN operation, a wireless station STA is connected to a WLAN via an AP. The wireless station gained access to the WLAN after having gone through the conventional authentication process which comprises the four-way handshake. The wireless link between the wireless station STA and the WLAN is subsequently broken. The broken wireless link may be due to movement of the STA away from an AP or due to a transient disruption in the wireless channel connecting the STA and the AP. After the wireless communication channel between the STA and the AP resumes operation, the wireless station STA and the AP will try to re-connect. The reconnection may be initiated by the wireless station making access request to the WLAN through the AP or by the AP upon noting a transition of an AP port from the 'disabled' state to the 'enabled' state.

Where a request to establish reconnection with the WLAN is initiated from the wireless station STA, the wireless station STA will send a first authentication message to the authenticator AP to request for data reconnection with the WLAN. The authenticator AP upon receipt of the first authentication message will determine whether this STA had a very recent valid or successful access to the WLAN. If the result of determination is positive, this means that the WLAN has found records of very recent access and the STA and the WLAN will undergo an expedited association process to shorten the time required to gain access to the WLAN. On the other hand, if the result of determination is negative, this means the WLAN has no record of recent access by the STA, the STA will need to make a request for a new access to the WLAN and to seek to start a totally new connection session.

Figure 1:
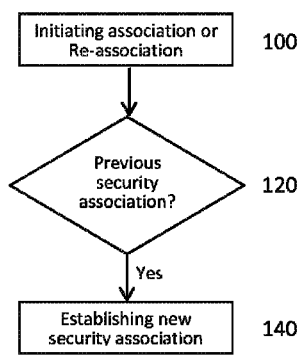
FIG. 1 depicts a method according to the present disclosure.
Figure 1A:
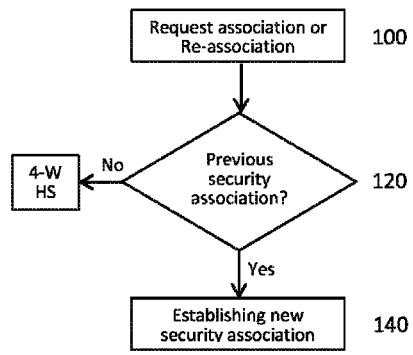
FIG. 1A depicts another method according to the present disclosure.

In general, there is provided a method of establishing network connection between a network device and a WLAN. The method comprises the WLAN upon receipt of a request for association or re-association at 100 to determine whether there is previous security association between the network device and the WLAN at 120, and establishing a new security association between the client device and the WLAN using security data generated in the course of establishing said previous security association if there is said previous security association at 140 as depicted in FIG. 1. This method will facilitate speedy re-association between a WLAN and a client device (such as a STA) if there was a recently in-force security association between the WLAN and the network device. If no speedy re-association is established, a new association will be established after going through a 4-way handshaking process as depicted in FIG. 1A.

In addition, there is disclosed a network admission apparatus 10, such as an access point (AP), as shown in FIG. 2. The network admission apparatus comprises a processor 12 to identify existence of previous security association between a client device, such as an STA, and a wireless network (WLAN) upon receipt of a request for association with said WLAN. Upon identification of said previous security association, the apparatus is to generate a new set of transient cryptographic keys to facilitate a data communication session between the client device and the WLAN using data generated in the course of establishing said previous security association. The cryptographic keys are transient because they are valid for a communication session only. The cryptographic keys are new because they are different to that generated and used during the previous security session. As depicted in FIG. 2, the apparatus 10 is to communicate with the WLAN using wireless frontend 14 upon execution of machine readable instructions 120, 140 stored in the memory 16.

There is also disclosed a network device 20 comprising a processor, memory 26 and a wireless frontend 24 for associating with a wireless network (WLAN). An STA or a wireless client terminal is an example of a network device. As depicted in FIG. 3, the network device is to identity previous security association with said WLAN and to generate new transient cryptographic keys to facilitate a new communication session with the WLAN using data generated in the course of establishing said previous security association upon identification of said previous security association.

In an example, the presence of previous security association in the form of PMKSA (Pairwise Master Key Security Association) specific to the STA making request for reconnection is used as an example criterion to determine whether there has been a recent valid or successful association the WLAN. As depicted at step 102 of FIG. 4, the STA will send a first authentication message to AP to request association or re-association with the WLAN. If PMKSA linked to this STA is found in the WLAN, a recent connection between the STA and the WLAN is confirmed and the 4-handshake steps will be bypassed as depicted at step 104. Cryptographic keys, especially transient keys such as PTK (Pairwise Transient Key) and GTK (Group Temporal Key), will be generated during the negotiation process to expedite association with the WLAN. Otherwise, the four-way authentication handshake as stipulated in IEEE 802.11i will be performed to establish or re-establish association with the WLAN. Upon successful determination that the STA had a recent valid or successful connection with the WLAN, the authenticator AP will return a second authentication message to the STA to confirm a positive or successful reconnection request as depicted at step 106.

The second authentication message contains a copy of the EAPOL-Key frame which was generated during the first of the 4-way handshake processes leading to the last valid security association with the WLAN when the AP and the STA negotiated for a PTK. The EAPOL-Key frame includes data such as Descriptor Type, Key Information, ANonce, and PMKID. If there is more than one PMKSA for the same STA on the WLAN, the PMKID of the most recent PMKSA will be selected and packaged in the key data.

Upon receipt of the second authentication message sent by the AP, the STA will determine at step 108 whether an EAPOL-key frame has been received. If no EAPOL-Key frame is present in this second authentication message sent by the AP, the four-way key handshake process will take place as depicted at step 108. If the second authentication message contains an EAPOL-key frame with an associated PMKID, the STA will make a comparison between the PMKID associated with the EAPOL-key frame of the second authentication message and the PMKID or PMKIDs cached on the STA at step 110. A satisfactory outcome of comparison of the PMKIDs will be taken as a confirmation that there is previous security association between the WLAN and STA and a speedy re-association process will be used to facilitate re-association. If the outcome of comparison is satisfactory, a new PTK and a new random number SNonce similar to that generated during the four-way handshake will be generated as depicted in step 202. The PTK for this new session will be calculated with reference to PMK, ANonce, SNonce, AP address, STA address as stipulated in IEEE 802.11. If the outcome of comparison is not satisfactory, no corresponding or equivalent PKMID is found, the attempted expedited PMK association is deemed failed and a new PMKID will be established after re-association has been established as depicted at step 110.

Next, the STA will send an association or re-association request frame to the AP in the following manner. This request frame will be sent as a third authentication message 204 as depicted in FIG. 4. If no EAPOL-Key frame is present in the second authentication message sent by the AP, the STA will proceed with the four-way authentication handshake process to negotiate a new PTK as depicted in step 108. Where there is locally cached PMKSA of the corresponding AP on the STA, one or a plurality of PMKID will be sent with the RNS cell of the message of the association or re-association request frame. On the other hand, if the outcome of PMKID comparison failed, no PMKID will be sent with the RNS cell and a fresh PMKSA will be established afresh. Where a correct PMKID has been found, this request frame will comprises the EAPOL-Key frame of the second of the four-way handshake generated in the course of establishing the last security association, and this EAPOL-Key frame includes Descriptor Type, Key Information, SNonce, MIC, etc.

When the connection or re-connection request frame is received by the AP, the AP will proceed in the following manner.

As depicted in FIG. 4A, the AP will determine whether EAPOL-Key frame and PMKID were sent to STA with the second authentication message at step 106. If the AP did not send PMKID to the STA, the four-way handshake authentication process will be performed. If a PMKID was found to have sent to the STA at step 106, the AP will examine whether the same PKMID is carried in the present association or re-association request frame and whether the EAPOL-Key frame is carried. If the examination result is positive, a PTK for this session will be constructed as depicted in step 208. The PTK will be constructed with reference to PMK, Anonce, Snonce, AP address, and STA address. In addition, MIC will be examined for correctness at step 208. If the MIC is correct, a PTKSA (Pairwise Transient Key Security Association) has been successfully established as depicted in step 210.

After PTKSA between the AP and the STA has been established, a fourth authentication message will be sent by the AP to the STA as depicted in step 212. This fourth authentication message includes a copy of EAPOL-Key frame generated at the third of the four-way handshake generated in the course of establishing the last security association will be sent to the STA when the AP responds to the association or re-association request frame. This EAPOL-Key frame will include data such as Descriptor Type, Key Information, MIC, GTK, beginning sequence number of a multicast.

With a successful PTK negotiation and issuance of the GTK, association between the STA and the WLAN is successful and data communication between the STA and the WLAN is ready as depicted in FIG. 4A.

Where the request to establish association or re-association is initiated from the AP, the wireless station STA will send a message in response to the request sent by the AP, and the response message by the STA will be the same as the first authentication message sent to the authenticator AP to request for data reconnection with the WLAN as mentioned above and the other steps are the same.

As depicted in FIG. 5, a straightforward re-association between the STA and the WLAN consists only of sending a first authentication message 102 from the AP to the STA carrying a request for association or re-association, a second authentication message 106 from the AP to the STA carrying a copy of EAPOL-Key frame generated at the first of the four-way handshake generated in the course of establishing the last security association, a third authentication message 204 from the STA to the AP carrying a copy of EAPOL-Key frame generated at the second of the four-way handshake generated in the course of establishing the last security association, and a fourth authentication message 212 from the AP to the STA carrying a copy of EAPOL-Key frame generated at the third of the four-way handshake generated in the course of establishing the last security association. The WLAN and the STA will re-establish security association as depicted at step 220 after the fourth authentication message 212 and without going through the four-way handshake authentication process. This speedy re-association process is advantageous as security association for WLAN access by the STA can be established with substantial time saving.

In the flow diagram of FIG. 6, the STA sent a first authentication message 102 to the STA carrying a request for association or re-association and received a second authentication message 106 carrying data such as Anonce and PMKID from the AP. The attempt for speedy re-association has failed. In order to continue re-association, the STA and AP will perform EAP authentication and establish new PMKSA as depicted in at step 214. New PTK and GTK will be constructed after going through the four-way handshake as depicted in step 216 and a new encrypted session will be established at step 220.

In the flow diagram of FIG. 7, the STA sent a first authentication message 102 to the STA carrying a request for association or re-association and received a second authentication message 106 carrying data such as Anonce and PMKID from the AP. No PMKID that is equivalent or corresponding to that coming from the AP is present in the STA and speedy re-association is deemed failed. As a result, STA and AP will cooperate to generate a new PMKID at steps 217 and 218, and new PTK and GTK will be constructed after going through the four-way handshake as depicted in step 216 and a new encrypted session will be established at step 220.

In this disclosure, the following abbreviations have been used:
AC: Access Controller
AP: Access Point
SSID: Service Set Identifier
PMK: Pairwise Master Key
PMKSA: Pairwise Master Key Security Association
PMKID: Pairwise Master Key Identifier
PTK: Pairwise Transient Key
PTKSA: Pairwise Transient Key Security Association
GTK: Group Temporal Key
RSNA: Robust Security Network Association While the present disclosure has been illustrated with reference to the above examples, it should be appreciated that the examples are for illustration only and shall not be used to restrict scope of the disclosure. For example, while various standards and protocols have been used herein for convenience, it should be understood that the present disclosure is not limited to such standards and/or protocols. Furthermore, where an apparatus comprising a processor is described, it should be appreciated that the processor can be a single processor, multiple processors, a cluster of processors, or distributed processors without loss of generality. Where a method or process is described herein, it should be appreciated that the method or process can be implemented by means of hardware, software, firmware or a combination thereof without loss of generality.

The invention claimed is:

1. A network admission apparatus comprising a processor to identify existence of previous security association between a client device and a wireless network (WLAN) upon receipt of a request for association with said WLAN, wherein the apparatus is to generate a set of new transient cryptographic keys to facilitate a data communication session between the client device and the WLAN using data generated in the course of establishing said previous security association upon identification of said previous security association.

2. A network admission apparatus according to claim 1, wherein the apparatus is to generate said set of new transient cryptographic keys for a new data communication session using data contained in EAPOL-key (Extensible Authentication Protocol on LAN-key) frames generated in the course of establishing said previous security association, said set of new transient cryptographic keys including a pairwise transient key (PTK) and a group temporal key (GTK).

3. A network admission apparatus according to claim 1, wherein said previous security association is by way of pairwise master key security association (PMKSA) and the apparatus is to send an authentication message including the first EAPOL-key (Extensible Authentication Protocol on LAN-key) frame generated in the course of establishing said previous security association in response to said request for association with the WLAN.

4. A network admission apparatus according to claim 3, wherein said apparatus is to perform a 4-way handshake as stipulated in IEEE 802.11i or equivalent to establish new security association upon failure to identify a valid previous security association with said client device.

5. A network admission apparatus according to claim 3, wherein said EAPOL-key frame includes pairwise master key identifier (PMKID) of said PMKSA.

6. A network admission apparatus according to claim 5, wherein the apparatus is to generate a transient key in the form of pairwise transient key (PTK) upon receipt of a response for the client device after receiving said PMKID.

7. A network admission apparatus according to claim 6, wherein the apparatus is to establish security association in the form of PTKSA (pairwise transient key security association) with said client device if the MIC (message integrity code) of the client device is correct.

8. A network device comprising a processor, a memory and a wireless frontend for associating with a wireless network (WLAN), wherein the network device is to identity previous security association with said WLAN and to generate new transient cryptographic keys to facilitate a new communication session with the WLAN using data generated in the course of establishing said previous security association upon identification of said previous security association.

9. A network device according to claim 8, wherein the processor is to identity said previous security association with said WLAN by comparing cached security data due to said previous security association and security data received from said WLAN in response to a new request for association with the WLAN.

10. A network device according to claim 9, wherein the processor is to compared pairwise master key identifier (PMKID) cached in the memory of said network device with PMKID received from said WLAN and to generate a pairwise transient key (PTK) upon satisfactory outcome of comparison.

11. A method of establishing network connection between a network device and a WLAN, the method comprising:
  determining whether there is previous security association between the network device and the WLAN at the time of requesting for network association, and
  establishing a new security association between the client device and the WLAN using security data generated in the course of establishing said previous security association if there is said previous security association.

12. A method according to claim 11, wherein the method includes generating new transient cryptographic keys to facilitate a new data communication session between the client device and the WLAN using data generated in the course of establishing said previous security association upon identification of said previous security association.

13. A method according to claim 12, wherein the method includes the WLAN generating said new transient cryptographic keys for a new data communication session using data contained in EAPOL-key (Extensible Authentication Protocol on LAN-key) frames generated in the course of establishing said previous security association.

14. A method according to claim 11, wherein said previous security association is by way of pairwise master key security association (PMKSA) and the apparatus is to send an authentication message including the first EAPOL-key (Extensible Authentication Protocol on LAN-key) frame generated in the course of establishing said previous security association in response to said request for association with the WLAN.

15. A method according to claim 14, wherein the method includes performing a 4-way handshake as stipulated in IEEE 802.11i or equivalent to establish new security association upon failure to identify a valid previous security association with said network device.

* * * * *